A. C. BOCHER.
ELECTRICALLY OPERATED VOTING APPARATUS.
APPLICATION FILED DEC. 18, 1918.
1,393,074.
Patented Oct. 11, 1921.
2 SHEETS—SHEET 2.
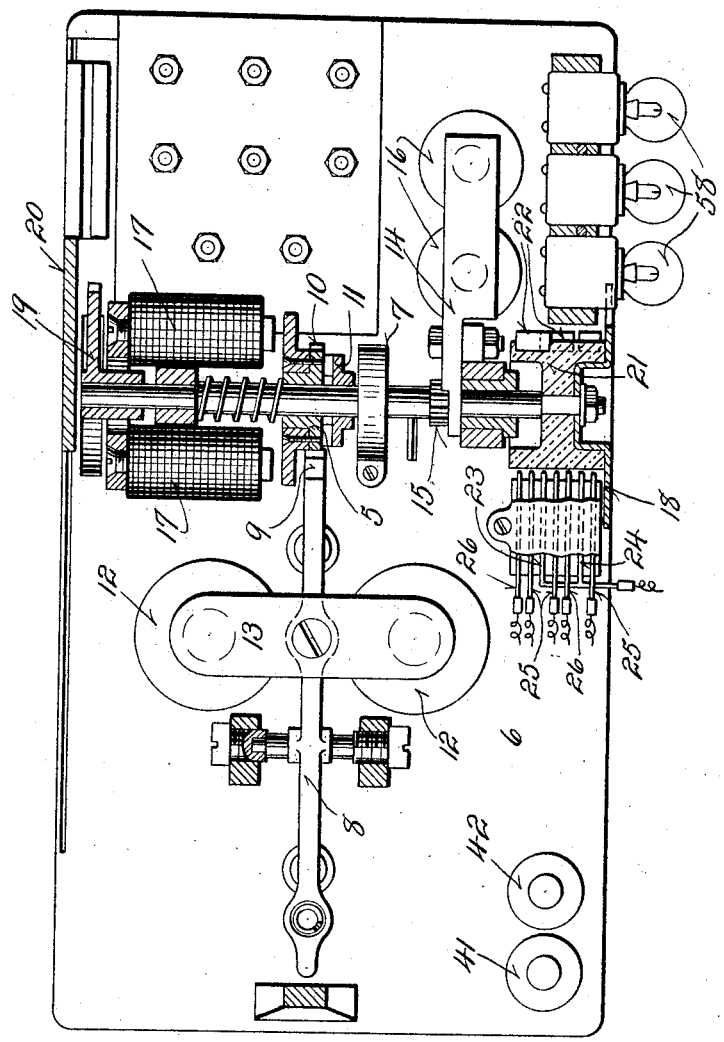
WITNESS:
J. P. Britt
INVENTOR
Aaron C. Bocher
BY Geo. Young
ATTORNEY

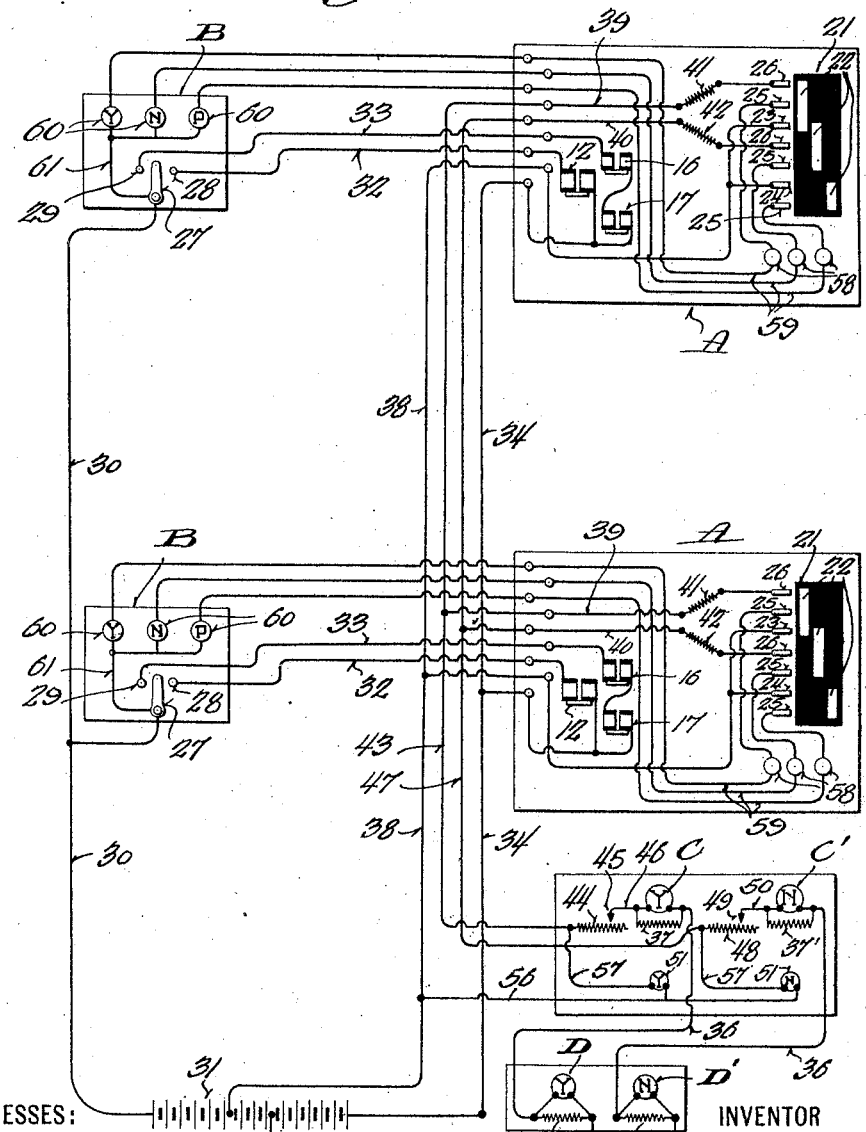

UNITED STATES PATENT OFFICE.

AARON C. BOCHER, OF MILWAUKEE, WISCONSIN.

ELECTRICALLY-OPERATED VOTING APPARATUS.

1,393,074.   Specification of Letters Patent.   Patented Oct. 11, 1921.

Application filed December 18, 1918. Serial No. 267,393.

*To all whom it may concern:*

Be it known that I, AARON C. BOCHER, a citizen of the United States, and resident of Milwaukee, in the county of Milwaukee and State of Wisconsin, have invented certain new and useful Improvements in Electrically-Operated Voting Apparatus; and I do hereby declare that the following is a full, clear, and exact description thereof.

My invention relates to new and useful improvements in electrically operated voting apparatus, more particularly of that type including a plurality of main station mechanisms located at a desired central point and operable by a plurality of corresponding substation mechanisms located at the voters' desk for procuring selective differing indications and actuations of the main station mechanisms, a non-interfering total vote indicating means being associated with the sets of corresponding indicating portions of the main station mechanisms and comprising a circuit for each set of corresponding portions having a meter therein and adapted for the selective inclusion of said portions in the circuit whereby the current passing through the circuit is variable in nature in accordance with the number of vote indicating portions included, whereby the totals of like votes may be registered.

One important object of my invention resides in the provision of a most readily operated means whereby the resistances of the totaling circuits may be independently varied to compensate for variations in the current conditions, to retain the accuracy of the vote indicating calibrations of the meters, and a further object in this connection resides in the provision of an arrangement whereby such variations in the current conditions may be instantly determined, and whereby such arrangement may be incorporated in the apparatus upon setting up the same, in a most accurate and economical manner.

A still further and important object resides in the provision of an arrangement for affording at each substation, a most positive indication of proper operation of the corresponding main station mechanism.

A still further object is to improve the general operation and arrangement of apparatus of this character.

With the above and other objects in view, which will be apparent as the description proceeds, my invention resides in the novel features of construction, combination and arrangement of parts as hereinafter described and defined by the appended claims.

In the accompanying drawings:

Figure 1 is a diagrammatic view of an electrical voting apparatus embodying my invention, a pair of voting units being shown in the present instance.

Fig. 2 is a plan view of one of the main station mechanisms.

In describing my invention, I will first describe the mechanical structure of one of the main station units in sufficient detail to set up its relation to the circuits of my invention, and thus, referring more particularly to Fig. 2, there is provided a shaft 5 suitably journaled on a base 6 and resiliently urged to rotation in one direction by a spring 7 coiled thereabout and secured to the base. Electrical means controlled by a circuit extending from a corresponding sub-station mechanism are employed for urging the shaft against the action of the spring and for releasing the shaft for resetting rotation under influence of the spring. Thus, a lever 8 is intermediately pivoted on the base and has one end toothed at 9 and vertically extended to form a rack engageable with an armature carried gear 10 loose on the shaft and resiliently urged to clutch engagement with a clutch member 11 fixed on the shaft. Rocking movement of the lever is procured by magnets 12 on the base coöperating with an armature 13 carried on the lever between its pivot and its gear engaging end, and the shaft is held in rotative steps thereto by the lever against the action of the spring 7 by an intermediately pivoted pawl 14 engageable at one end with a ratchet wheel 15 fixed on the shaft and releasable by a pair of magnets 16 arranged to attract the other end of said pawl. The shaft is relieved from meshing connection with the teeth of the lever 8 by a pair of magnets 17 arranged to shift the armature carried gear 10 out of engagement with the clutch 11 and still retaining its mesh with the lever teeth 9.

Thus successive actuation of the magnets 12 will procure successive rotative movements of the shaft, while simultaneous actuations of the magnets 16 and 17 will release the shaft for resetting rotation in a retrograde direction under influence of the spring.

Carried on one end of the shaft is a symbol dial 18 and carried on the rear of the shaft is a segment 19 for operating a symbol slide rack 20. Also carried on the shaft is a drum 21 carrying three contact blocks 22 disposed at regularly spaced intervals in step relation transversely of the drum periphery, said blocks being elongated longitudinally of the axis of the drum, and two of said blocks having their adjacent ends overlapped and being of greater length than the remaining block. Mounted on the base for contact with the blocks in successive manner upon rotation of the drum are a series of regularly spaced contact fingers, two of said fingers, termed the current supply fingers and designated at 23 and 24 being engageable, one with either of the lapped end portions of the two long contact bars and the other with the remaining bar. Engageable with each of the three contact blocks is a lamp circuit contact finger 25, and engageable with each of the two long contact blocks is a resistance circuit contact finger 26, the particular relation and operation of these fingers and blocks being later described, although it may be at this point stated that each of the blocks corresponds to a voting indication, "Yes," "No," or "Paired," the engagement of each block with its set of fingers closing circuits therethrough for the various voting indications, and since it is not deemed necessary to count the numbers of paired votes in parliamentary procedure, no totaling circuit finger is provided for the short contact block, which indicates a paired vote when connecting its set of two fingers, 24 and 25. A totaling finger may, however be provided if desired.

Referring now to Fig. 1, A designates each of a pair of these main station mechanisms and B designates each of a pair of co-acting sub-stations, which contains a switch adapted to actuate either the magnets 12 which control the step by step actuation of the shaft and hence are termed the voting magnets, or to actuate the releasing magnets 16 and 17. This switch comprises a pivoted contact bar 27 which is preferably provided with a conventional lock controlled means and movable to selectively engage voting and release contact members 28 and 29 respectively. The movable contact member 27 is connected by branches of a main supply line 30 with the endmost of a series of batteries 31 with respect to each sub-station, wires 32 and 33 extending respectively from the contact 28 to the voting magnets 12 and from the contact 29 to the release magnets 16 and 17. Branches of a common return line 34 extend from the magnets of the main station mechanism to the other end of the series of batteries.

Thus, upon pressing a voting contact member 27 into contact with a member 28, the current will pass from the battery and wire 30 and through the wire 32 to the magnet 12, returning to the battery through the wire 34, and thus imparting a rotative step to the drum 31 and closing the gaps between one of the contact blocks and its set of fingers. To procure the other voting indications, the voting switch is closed a second or third time, and the apparatus is "cleared" or reset by single engagement of the contact member 27 with the contact 28, closing a circuit through the wire 33 and the releasing magnets 16 and 17.

Taking up now the indicating means for totaling like votes, in the present instance such votes being "yes" and "no" votes, there is provided at a suitable convenient position, hereinafter termed the operator's position, a pair of milli-volt meters C and C' calibrated to read total "yes" and "no" votes respectively under certain current conditions. Also located at another position, preferably the desk of the speaker of the legislature or other assembly with which my apparatus is used, there is provided a second pair of milli-volt meters D and D' calibrated to read total "yes" and "no" votes under current conditions corresponding to conditions procuring similar totals in the milli-volt meters C and C', each of these totaling vote meters D and D' having their shunts 35 and 35' interposed in lines 36 extending from the corresponding shunts 37 and 37' of the meters C and C' and connected by a common return 36ª with an intermediate one of the series of batteries. A line 38 extends from another intermediate one of the series of batteries and is branched for connection with the current supply fingers 23 and 24 of each main station mechanism, the fingers 23 only being concerned in the present instance with the totaling circuits. Extending from corresponding total vote contact fingers 26 of the mechanisms are lines 39 in which are interposed resistance coils 41, and extending from the other fingers 26 are lines 40 in which are interposed similar resistance coils 42. The lines 39 of the main station mechanisms are connected with a common line 43 which forms a part of the main "yes" vote totaling circuit, and which terminates in a resistance coil 44 over which is movable a contact finger 45 connected with the shunt 37 of the milli-volt meter C by a wire 46, a rheostat being thus provided in the meter circuit. Similarly, the lines 40 are connected with a common line 47 forming part of the main "no" vote totaling circuit, this line 47 terminating in a similar rheostat coil 48 over which is movable a finger 49 connected by a wire 50 with the shunt 37' of the milli-volt meter C'. For measuring the voltage of these circuits, volt meters 51 are bridged between the lines 43 and 47 and the main supply line 38, being connected to the line 38 by a wire 56 and to the lines 43 and 47 by wires 57.

Thus, the number of resistance units 41 or 42 thrown in a corresponding totaling circuit by the vote indicating actuations of the main station mechanism, will register the totals of like votes of the mechanisms.

Tracing now the "yes" totaling circuit the current passes from the line 38 connected with the battery to the contact fingers 23 and thence through the block or blocks 22 which are disposed in totaling position to the engaging finger or fingers 26 and thence through the line or lines 39 and the resistance coil or coils 41 to the main circuit wire 43, thence through the rheostat coil 44, the contact 45, wire 46, shunt 37 of the meter C, wire 36, shunt 35 of the meter D, and wire 36ª back to the battery, it being noted that only a small number of intermediate battery elements are utilized. The "no" vote totaling circuit may be similarly traced.

To procure proper calibration of the various meters of the apparatus, when it is set up, successive numbers of vote resistances are included in the totaling circuits, starting from one, and the positions of the indicating needles of the meters are recorded, both with respect to the milli-volt meters C, C', D and D' and with respect to the volt meters 51. Thus, all of the meters will read alike under the normal current conditions employed when this calibration is effected. It is noted that the range of the volt meters 51 is different from the range of the milli-volt meters. Therefore, should a current vary from its normal condition for procuring accurate totals, the readings of the volt meter 51 and its corresponding meter C or C' at the operator's outfit will not agree, and the operator then shifts the rheostat contact 45 or 49 to restore the normal current conditions and to restore the identical and correct readings of the meters in terms of votes, which obtain only under such normal current conditions.

A plurality of vote indicating lamps 58 for each indicating mechanism are disposed in lines 59 extending from the fingers 25 engageable with the drum blocks 22, and the lines 59 of each main station mechanism are extended to its corresponding sub-station and have interposed therein at the sub-station a second set of lamps 60 which, being in series with the main station lamps thus afford a positive tell-tale of the operation of the main station mechanism, whereby the voter at the sub-station is given both a reminder of his voting action and an assurance of the proper registration thereof. These lamps 60 are connected by a common line 61 with the main supply line 30, which is as shown, branched to include each of the sub-stations.

I claim:

1. A voting apparatus comprising a main station including a plurality of indicating mechanisms each provided with a plurality a circuit closing members, a plurality of sub-stations each including means for actuating the circuit closing members of a corresponding indicating mechanism, a plurality of circuits each including branches associated with corresponding circuit closing members, resistance units in said branches, a pair of meters differential in nature, associated with each of said circuits and calibrated to give identical readings under normal current conditions, and means for controlling current in said circuits to maintain such normal conditions.

2. A voting apparatus comprising a main station including a plurality of indicating mechanisms each provided with a plurality of circuit closing members, a plurality of sub-stations each including means for actuating the circuit closing members of a corresponding indicating mechanism, a plurality of circuits each including branches associated with corresponding circuit closing members, resistance units in said branches, a pair of meters differential in nature, associated with each of said circuits and calibrated to give identical readings under normal current conditions, and a rheostat in each circuit.

3. A voting apparatus comprising a main station including a plurality of indicating mechanisms each provided with a plurality of circuit closing members, a plurality of sub-stations each including means for actuating the circuit closing members of a corresponding indicating mechanism, a plurality of circuits each including branches associated with corresponding circuit closing members, resistance units in said branches, a millivolt-meter in each circuit, a volt meter associated with each circuit, the millivolt-meter and volt meter of each circuit being calibrated to read in identical terms of votes under normal current conditions, and means for maintaining normal current conditions in each circuit.

In testimony that I claim the foregoing I have hereunto set my hand at Milwaukee, in the county of Milwaukee and State of Wisconsin.

AARON C. BOCHER.